United States Patent [19]

Winski et al.

[11] Patent Number: 4,704,060
[45] Date of Patent: Nov. 3, 1987

[54] PALLETIZER

[76] Inventors: Ernest P. Winski, Rte. 4, 5413 Nickels Dr., Oshkosh, Wis. 54901; Clifton B. McMurry, Rte. 4, 2692 Lakeview, Fond du Lac, Wis. 54935; Leonard Miaskoff, 65 Trafalgar Dr., Plattsburgh, N.Y. 12901

[21] Appl. No.: 770,268

[22] Filed: Aug. 28, 1985

[51] Int. Cl.$^4$ ............................................. B65G 57/20
[52] U.S. Cl. ........................................ 414/68; 414/84; 414/85; 414/786; 414/907
[58] Field of Search ........................ 414/68, 70, 71, 82, 414/84, 85, 87, 907, 786

[56] References Cited

U.S. PATENT DOCUMENTS

| | | | |
|---|---|---|---|
| 2,878,948 | 3/1959 | Keyes | 414/85 X |
| 3,157,301 | 11/1964 | McWilliams | 414/85 |
| 3,278,048 | 10/1966 | Bruce | 414/85 |
| 4,067,456 | 1/1978 | Schmitt | 414/84 X |
| 4,159,058 | 6/1979 | Zimmerman | 414/84 |
| 4,162,016 | 7/1979 | Schmitt | 414/85 |
| 4,339,220 | 7/1982 | Pulda | 414/84 |

FOREIGN PATENT DOCUMENTS

3107495  11/1982  Fed. Rep. of Germany ........ 414/70
54-129661 10/1979  Japan ................................. 414/84

Primary Examiner—Leslie J. Paperner
Attorney, Agent, or Firm—Thomas D. Wilhelm

[57] ABSTRACT

A palletizing apparatus usable for depositing material on an underlying surface, and particularly an underlying layer of compressible material. The apparatus comprises a frame, a plate means mounted on the frame for vertically and horizontally moving the plate means relative to the frame, the plate means including an upwardly facing surface adapted for carrying a stack of material and a downwardly facing surface having therein a plurality of recesses extending in the direction of the horizontal movement of the plate means. Projections mounted on the frame extend upwardly into the recesses for preventing a previously deposited layer of materials from moving with the plate means as the plate means is withdrawn from under the stack. The palletizer further comprises means for withdrawing the plate means from under the stack while an underlying layer of compressible material is under compression.

51 Claims, 12 Drawing Figures

PALLETIZER

RELATED APPLICATION

For purposes of claiming priority under 35 USC 120, reference is made to U.S. Winski, et al. application Ser. No. 746,997, filed June 19, 1985, titled "Newspaper Palletizer," now abandoned.

BACKGROUND OF THE INVENTION

The invention relates to a palletizing apparatus for palletizing stacks of loose materials such as newspapers, signatures, sheets of paper, rug tiles, flat bags, or open-flapped cases.

Apparatus for palletizing bundles of newspapers and apparatus for palletizing loose signature stacks are known in the art. However, the inventors know of no palletizer that is well suited for palletizing stacks of loose (unbound) newspapers.

One type of conventional palletizer for boxes or cartons uses a horizontally, reciprocally movable stripper plate for carrying boxes to a position above a pallet onto which the boxes are to be loaded. The stripper plate is then withdrawn from beneath the boxes, thereby depositing them onto the pallet. Retaining means are used for preventing the boxes from moving with the stripper plate as it is withdrawn. Such retaining means commonly include a bar which abuts the side of the boxes facing the direction of stripper plate withdrawal. This type of palletizer cannot be used for palletizing loose newspapers or the like.

A problem with palletizing stacks of loose newspapers or loose sheets of paper is that the sheet or sheets of paper immediately adjacent the stripper plate frequently stick to and move with the stripper plate as it is withdrawn.

Another problem with palletizing stacks of newspapers is that the upper surfaces of the stacks are usually uneven, rather than even. Also a stray flap will sometimes extend upwardly from the stack. Thus, it may be desirable to compress a previously deposited stack of papers before depositing an additional stack thereon. Also, an electric eye determining the level of a previously deposited stack of papers can be deceived by an upwardly extending flap, thereby causing the next stack of papers to be dropped from too great a distance above the previously deposited stack.

Attention is directed to the following U.S. patents which disclose palletizing apparatus:
Locke: U.S. Pat. No. 2,875,907
Woodcock: U.S. Pat. No. 2,875,908
Keys: U.S. Pat. No. 2,878,948
Gagnon: U.S. Pat. No. 3,149,732
Jeremiah: U.S. Pat. No. 3,166,203
Kampert: U.S. Pat. No. 3,257,006
Grasvoll: U.S. Pat. No. 3,594,977
Larson: U.S. Pat. No. 3,606,310
Brockmuller: U.S. Pat. No. 3,637,093
Grasvoll: U.S. Pat. No. 3,648,857
Carlson: U.S. Pat. No. 3,669,282
Alduk: U.S. Pat. No. 3,833,132
Golantsev: U.S. Pat. No. 3,837,140
Kelley: U.S. Pat. No. 4,030,618
Schmitt: U.S. Pat. No. 4,162,016
Schmitt: U.S. Pat. No. 4,195,959
Pantin: U.S. Pat. No. 4,205,934
Faltin: U.S. Pat. No. 4,230,311
Donnelly: U.S. Pat. No. 4,234,280
Meratti: U.S. Pat. No. 4,255,074
Cox: U.S. Pat. No. 4,342,531
Sylvander: U.S. Pat. No. 4,383,788
Werkheiser: U.S. Pat. No. 4,422,549
Werkheiser: U.S. Pat. No. 4,439,084
Wise: U.S. Pat. No. 4,477,067

SUMMARY OF THE INVENTION

The invention provides a palletizing apparatus for depositing material on a pallet. The apparatus comprises a frame including four generally vertical posts defining the four corners of a rectangle, and a generally rectangular carriage having opposite first and second ends and four corners respectively connected to the four posts of the frame for reciprocal vertical movement of the carriage relative to the frame and to the pallet.

The apparatus also comprises means for reciprocally, vertically moving the carriage relative to the frame. In the preferred embodiment, each post includes an upper and lower sprocket and an endless drive chain mounted around the sprockets and connected to the carriage. The four endless chains are interconnected for common movement.

The apparatus also comprises generally horizontal plate means mounted on the carriage for reciprocal, horizontal movement relative to the carriage between a first position wherein the plate means is adjacent the first end of the carriage and above the pallet and a second position wherein the plate means is adjacent the second end of the carriage and not above the pallet. In the preferred embodiment, the plate means includes a stripper plate, and a sensing plate mounted beneath the stripper plate for vertical movement relative to the stripper plate from a first or lower position wherein the sensing plate is spaced beneath the stripper plate. The stripper plate includes an upper surface having thereon a plurality of generally parallel, spaced apart, low-friction strips extending in the direction of plate means movement and having upper surfaces combining to define an upwardly facing surface adapted to carry the stack of papers while the plate means moves from the second position to the first position, with the spaces between the strips defining a plurality of recesses in the upwardly facing surface. The sensing plate includes a lower surface having thereon a plurality of generally parallel, spaced apart, low-friction strips extending in the direction of the plate means movement and having lower surfaces combining to define a downwardly facing surface adapted to contact a previously deposited stack of papers, with the spaces between the strips defining a plurality of recesses in the downwardly facing surface.

In the preferred embodiment, the carriage includes a pair of generally parallel, horizontal, spaced-apart side members extending in the direction of plate means movement or between the first and second ends of the carriage and movably supporting the plate means therebetween. One side member defines a first channel opening inwardly toward the plate means and having opposed upper and lower generally horizontal surfaces, and the other side member defines a second channel opening inwardly toward the plate means and having opposed upper and lower generally horizontal surfaces. The stripper plate includes a pair of wheels rotatably mounted on one side of the stripper plate and received in the first channel for rolling movement along one of the upper and lower surfaces of the first channel, and a pair of wheels rotatably mounted on the other side of the stripper plate and received in the second channel for rolling movement along one of the upper and lower surface of the second channel.

The apparatus further comprises means for reciprocally moving the plate means between the first and second positions. Preferably, this means includes endless chains running through the first and second channels of the side members of the carriage and being connected to the stripper plate for moving the wheels within the channels.

The apparatus further comprises first projection or combing means mounted on the carriage and extending downwardly into the recesses in the upwardly facing surface of the stripper plate for preventing the stack of papers from moving with the stripper plate as the plate means is withdrawn from the first position to the second position, and second projection or combing means mounted on the carriage and extending upwardly into the recesses in the downwardly facing surface of the sensing plate for preventing a previously deposited stack of papers from moving with the sensing plate as the plate means is withdrawn from the first position to the second position. This arrangement solves the problem present in the prior art of having sheets of paper move with the plate means as it is withdrawn.

The carriage is adapted to be lowered toward the pallet of a previously deposited stack of papers in order to deposit an additional stack of papers thereon, and the apparatus further comprises means on the plate means for stopping downward movement of the carriage relative to the pallet or the previously deposited stack of papers. Preferably, the means for stopping downward movement of the carriage includes means for stopping downward movement of the carriage when the sensing plate moves upwardly from the lower position in response to contacting the pallet or the previously deposited stack of papers. The sensing plate avoids the problem of having an electric eye deceived by a flap extending upwardly from the previously deposited stack of papers, because the sensing plate will not move upwardly when it contacts the flap, but will remain in the lower or first position until the flap is compressed and the sensing plate contacts the body of the previously deposited stack of papers. Therefore, the next stack of papers will be deposited directly on the body of the previously deposited stack, rather than being dropped from an unnecessary height.

The apparatus can also include means for compressing the previously deposited stack of papers with the plate means. Preferably, this compressing means includes the carriage chain-drive arrangement. Because the carriage is driven by endless chains, the chains can be used to pull down on the carriage to cause the sensing plate means to compress the previously deposited stack of papers.

The apparatus can also include means for stopping downward movement of the carriage when the upward force on the sensing plate means is equal to a predetermined value. Preferably, this sensing means includes a load cell attached to at least one of the chains for sensing the tension on the chain. This provides a means for obtaining any desired compression of the previously deposited stack of papers.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE ILLUSTRATED EMBODIMENT

A palletizer 10 embodying the invention is illustrated in the drawings. The palletizer 10 is usable for depositing material and especially loose material such as papers 12 on a supporting surface such as a pallet or a previously deposited stack of papers.

Figure 1:
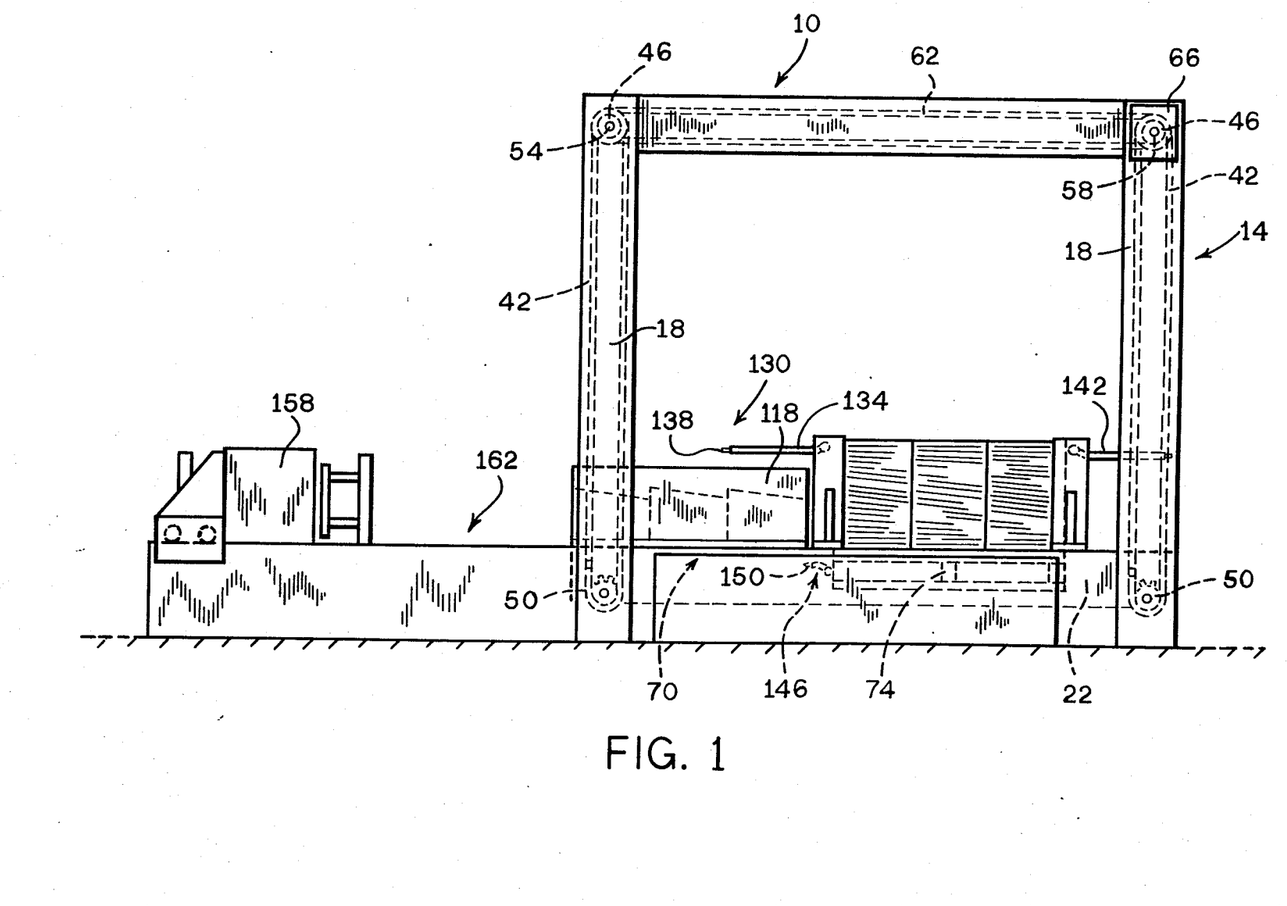
FIG. 1 is a side elevational view of a palletizer embodying the invention.
Figure 2:
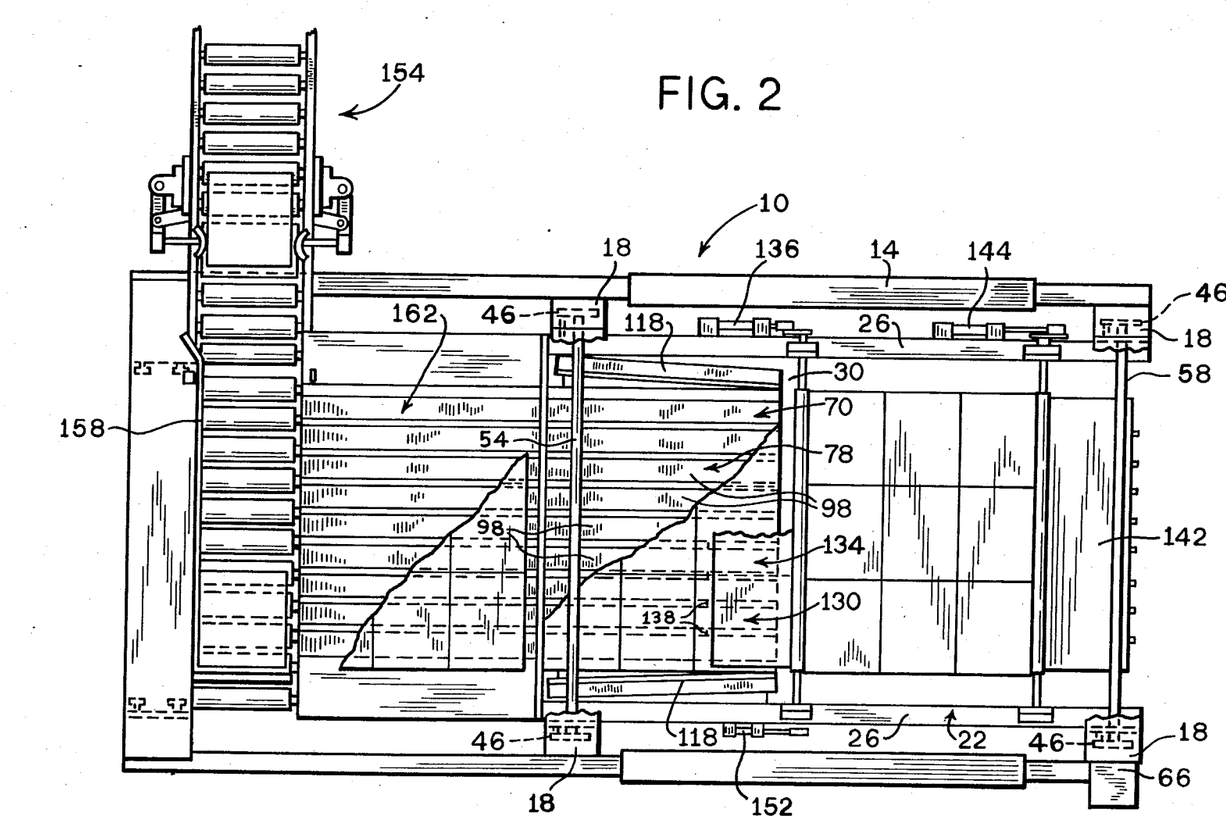
FIG. 2 is a top view of the palletizer.
Figure 3:
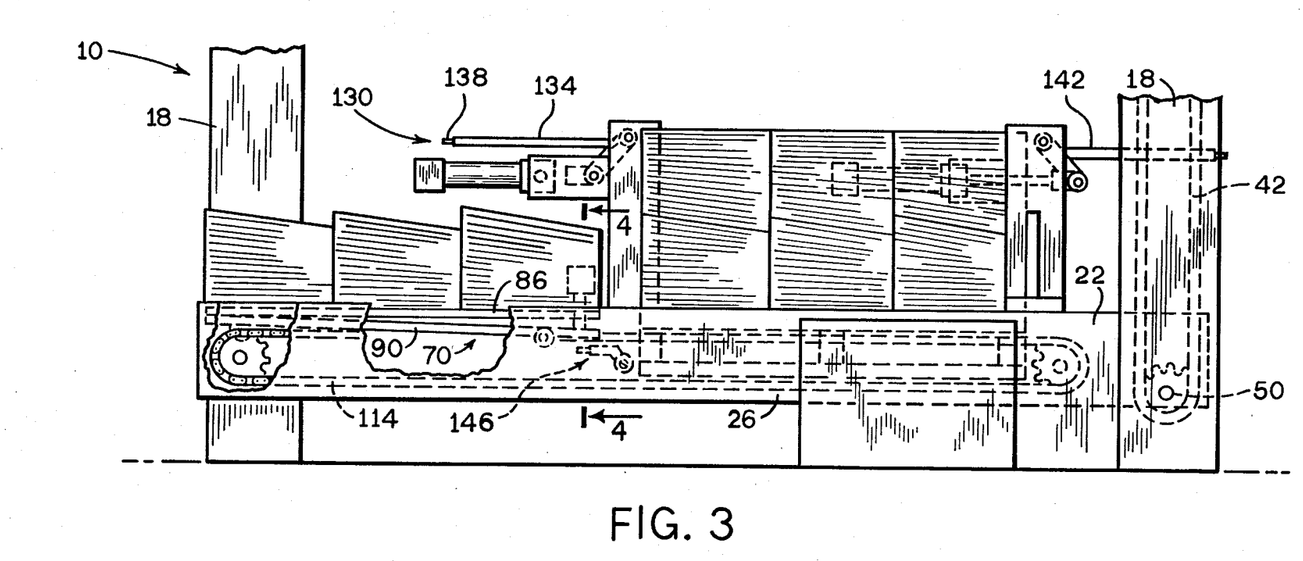
FIG. 3 is an enlarged, partial side view, partially cut away, of the palletizer.

As best shown in FIGS. 1 and 2, the palletizer 10 comprises a frame 14 including four generally vertical members or posts 18 defining the four corners of a rectangle. The palletizer 10 also comprises a generally rectangular, horizontally disposed carriage 22 having opposite first and second or right and left ends and four corners respectively connected to the four posts 18 of the frame 14 for vertical movement relative thereto.

Figure 4:
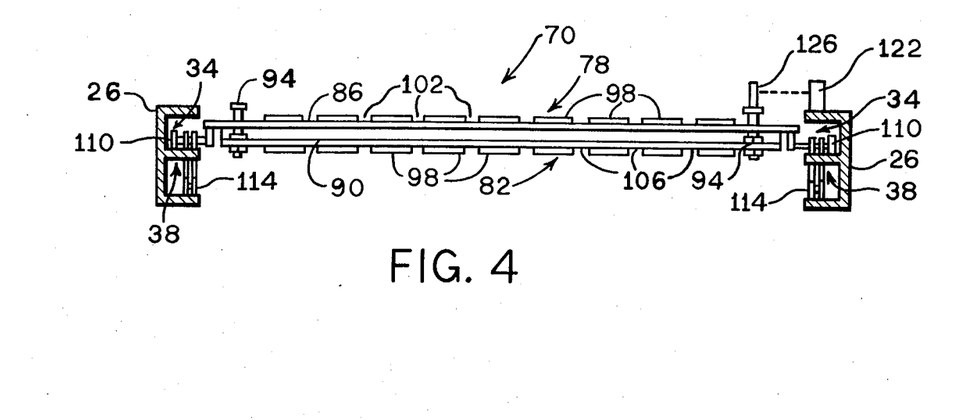
FIG. 4 is a cross-sectional view taken along line 4—4 in FIG. 3.

In the illustrated construction, the carriage 22 includes first and second generally parallel, horizontal, spaced apart side members 26 connected by a central support member 30. As best shown in FIG. 4, each of the side members 26 has an E-shaped cross section and defines upper and lower channels 34 and 38 opening inwardly and having opposed upper and lower generally horizontal surfaces.

The palletizer 10 also comprises means for reciprocally, vertically moving the carriage 22 relative to the frame 14. In the preferred embodiment, the means for moving the carriage 22 includes means on each of the frame posts 18 for causing relative movement of the respective corner of the carriage 22. Preferably, the means on each of the posts 18 includes an endless chain 42 connected to the respective corner of the carriage 22. As best shown in FIG. 1, each post 18 includes an upper drive sprocket 46 and a lower idler sprocket 50, with the endless chain 42 mounted around the sprockets 46 and 50. The upper sprockets 46 of the two left posts 18 (as viewed in FIG. 2) are connected by a horizontal drive shaft 54, and the upper sprockets 46 of the two right posts 18 (as viewed in FIG. 2) are connected by a horizontal drive shaft 58. Also, the upper sprockets 46 of the two lower posts 18 (as viewed in FIG. 2) are connected by an endless drive chain 62. Drive means 66 is connected to the drive shaft 58 to drive the two right chains 42, and, via the endless chain 62 and the drive shaft 54, the two left chains 42. Accordingly, the four endless chains 42 move in common, thereby causing common movement of the four corners of the carriage 22.

The palletizer 10 also comprises generally horizontal plate means 70 mounted on the carriage 22 for reciprocal horizontal movement relative to the carriage 22 between a first or right position (FIGS. 6 and 7) wherein the plate means 70 is adjacent the first or right end of the carriage 22 and a second or left position (FIGS. 1 and 2) wherein the plate means 70 is adjacent the second or left end of the carriage 22. A pallet 74 is placed beneath the first end of the carriage 22 so that when the plate means 70 is in the first position it is above the pallet 74. The plate means 70 includes an upwardly facing surface 78 adapted to carry the articles or stack of papers to be palletized during movement of the plate means 70 from the second or left position to the first or right position. The plate means 70 also includes a downwardly facing surface 82.

Figure 12:
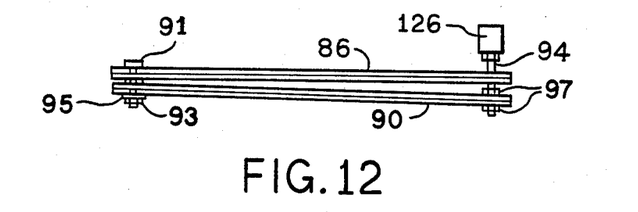
FIG. 12 is a side view of the stripper plate and sensing plate.

In the preferred embodiment, the plate means 70 includes a stripper plate 86 including the upwardly facing surface 78, and a sensing plate 90 including the downwardly facing surface 82 of the plate means 70. The sensing plate 90 is mounted beneath the stripper plate 86 for vertical movement relative to the stripper plate 86 from a first or lower position wherein the sensing plate 90 is spaced beneath the stripper plate 86. Preferably, the sensing plate 90 is pivotally connected to the stripper plate 86 at the left end (as viewed in FIGS. 1 and 12) of the stripper plate 86, and is movably connected to the right end of the stripper plate 86. Preferably, the left end of the sensing plate 90 is pivotally connected to the left end of the stripper plate 86 by bolts 91 threaded into the stripper plate 86 and having lower ends extending through apertures in the sensing plate 90. Nuts 93 and washers 95 secure the lower ends of the bolts 91 to the sensing plate 90 while allowing room for pivotal movement of the sensing plate 90. In the illustrated construction, the right end of the stripper plate 86 includes a pair of apertures, and the right end of the sensing plate 90 includes a pair of bolts 94 slidably extending through the apertures in the stripper plate 86, the lower ends of the bolts 94 being secured to the sensing plate 90 by a pair of nuts 97. The heads of the bolts 94 restrict downward movement of the sensing plate 90 relative to the stripper plate 86.

The stripper plate 86 has an upper surface having thereon a plurality of generally parallel, spaced apart, low-friction strips 98 extending in the direction of plate means movement and having upper surfaces combined to define the upwardly facing surface 78 of the plate means 70, with the spaces between the strips 98 defining recesses 102 in the upwardly facing surface 78. In the illustrated construction, the stripper plate 86 includes a pair of guide members 118 (FIG. 2) for positioning stacks of papers on the stripper plate 86.

The sensing plate 90 has a lower surface having thereon a plurality of generally parallel, spaced apart, low-friction strips 98 extending in the direction of plate means movement and having lower surfaces combining to define the downwardly facing surface 82 of the plate means 70, with the spaces between the strips 98 defining recesses 106 in the downwardly facing surface 82.

Preferably, the plate means 70 is mounted on the carriage 22 by a pair of wheels 110 rotatably mounted on one side of the stripper plate 86 and received in the upper channel 34 of the first carriage side member 26 for rolling movement along one of the upper and lower surfaces of the channel 34, and a pair of wheels 110 rotatably mounted on the other side of the stripper plate 86 and received in the upper channel 34 of the second carriage side member 26 for rolling movement along one of the upper and lower surfaces of the channel 34. Normally, as shown in FIG. 4, the wheels 110 roll along the lower surfaces of the channels 34.

The palletizer 10 further comprises means for reciprocally moving the plate means 70 between the first or right position and the second or left position. In the preferred embodiment, the means for moving the plate means 70 includes, on each of the side members 26 of the carriage 22, an endless chain 114 extending through the upper and lower channels 34 and 38 connected to the stripper plate 86. The endless chains 114 are connected to a common drive means (not shown).

The palletizer 10 further comprises means for stopping downward movement of the carriage 22 relative to the supporting surface (the pallet or a previously deposited layer). In the preferred embodiment, the means for stopping downward movement of the carriage 22 includes the sensing plate 90, and means for stopping downward movement of the carriage 22 when the sensing plate 90 moves upwardly from the first or lower position in response to contacting the supporting surface. Preferably, as best shown in FIG. 1, this means includes a proximity sensor 122 fixedly attached to the carriage 22, and a plate 126 attached to the head of one of the bolts 94 for triggering the proximity sensor 122 when the sensing plate 90 moves upwardly relative to the stripper plate 86. Alternatively, an electric eye 128 (see FIG. 5) on the carriage 22 beneath the level of the sensing plate 90 can be used for stopping downward movement of the carriage 22. In fact, it may be preferable to use the electric eye 128 rather than the sensing plate 90 to stop the carriage 22 relative to en empty pallet.

Figure 9:
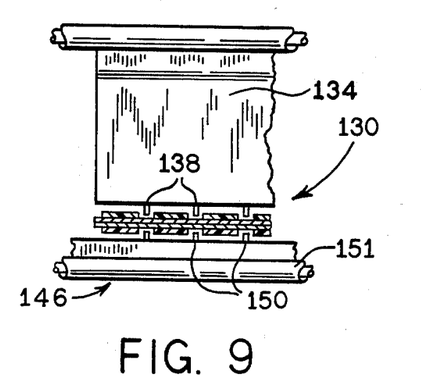
FIG. 9 is a cross-sectional view taken along line 9—9 in FIG. 7.

The palletizer 10 further comprises stripper means for preventing the stack of papers from moving with the stripper plate 86 as the plate means 70 is withdrawn from the first position to the second position (from right to left in the drawings), and second stripper means for preventing a previously deposited stack of papers from moving with the sensing plate 90 as the plate means 70 is withdrawn. In the preferred embodiment, the stripper means includes projection or combing means 130 mounted on the carriage 22 and extending downwardly into the recesses 102 in the upwardly facing surface 78 of the stripper plate 86 for preventing the stack of papers from moving with the stripper plate 86 as the plate means 70 is withdrawn. In the illustrated construction, the carriage 22 includes an end guide member or plate 134 pivotally movable between a raised position (see FIG. 5) wherein the plate 134 is parallel to the stripper plate 86, and a lowered position (see FIG. 6) wherein the plate 134 is perpendicular to the stripper plate 86. Linear motion means 136 for moving the plate 134 between the raised and lowered positions is shown in the drawings. The proejection means 130 preferably includes a plurality of fingers 138 which extend downwardly from the lower end of the plate 134 into the stripper plate recesses 102 when the plate 134 is in the lowered position. This is best shown in FIG. 9. The guide plate 134 and the fingers 138 restrain the stack of papers as the stripper plate 86 is withdrawn.

The carriage 22 also includes a second guide member or plate 142 similar to the first plate 134 for restraining the layer of papers when the stripper plate 86 is in the first or right position. Linear motion means 144 for moving the plate 142 between its raised and lowered positions is shown in the drawings.

The second or lower stripper means preferably includes second projection or combing means 146 mounted on the carriage 22 and extending upwardly into the recesses 106 in the downwardly facing surface 82 of the sensing plate 90 for preventing a previously deposited stack of papers from moving with the sensing plate 90 as the plate means 70 is withdrawn. Preferably, the second projection means 146 includes a plurality of fingers 150 mounted on a pivotally movable horizontal shaft 151 so as to be pivotally movable between a lowered position best shown in FIG. 5, and a raised position best shown in FIGS. 6, 7, and 8. Linear motion means 152 for moving the fingers 150 between the raised and lowered positions is shown in the drawings.

The palletizer 10 further comprises conveyor means 154 (FIG. 2) extending generally perpendicularly to the direction of plate means movement adjacent the left end of the carriage 22, and means for moving stacks of papers from the conveyor means 154 onto the plate means 70 when the plate means 70 is in the second or left position. In the illustrated construction, the conveyor means 154 is a conventional roller conveyor. In the preferred embodiment, the palletizer 10 includes a staging area 162 (FIG. 2) between the end of the conveyor 154 and the end of the frame 14 to permit an entire layer of papers to be arranged before being pushed onto the stripper plate 86.

Preferably, the means for moving stacks of papers from the conveyor means 154 onto the stripper plate 86 includes pusher means 158 reciprocally movable across the conveyor means 154 and the staging area 162 in the direction of plate means movement. In the preferred embodiment, the pusher means 158 includes a plurality of fingers extending downwardly between the rollers of the conveyor 154 to ensure that all papers are pushed off the conveyor 154.

It should be understood that in alternative embodiments of the invention, the plate means 70 need not include a stripper plate 86 and a sensing plate 90. For example, the plate means 70 can include only a stripper plate having the low-friction strips on its upper and lower surfaces.

Figure 10:
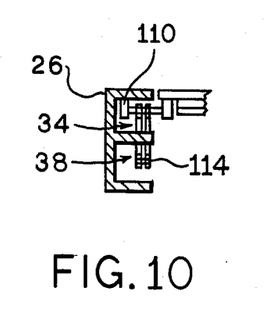
FIG. 10 is a partial cross-sectional view similar to FIG. 4.

The sensing plate arrangement can also be used to compress a previously deposited stack of papers. In fact, the sensing plate 90 necessarily causes some compression of the previously deposited stack, since the previously deposited stack must support some of the weight of the sensing plate 90 to move the sensing plate 90 upwardly relative to the stripper plate 86 in order to stop downward movement of the carriage 22. If there is a delay between the time when the sensing plate 90 moves upwardly to trigger the proximity sensor 122 and the time when the carriage 22 is stopped, the carriage 22 can continue to move downwardly causing the previously deposited stack to also bear the weight of the stripper plate 86 and even the entire carriage 22. Once the weight of the stripper plate 86 is supported by the previously deposited stack, the stripper plate wheels 110 move upwardly in the carriage channels 34, as shown in FIG. 10, until the wheels 110 ride along the upper surfaces of the channels 34.

Figure 11:
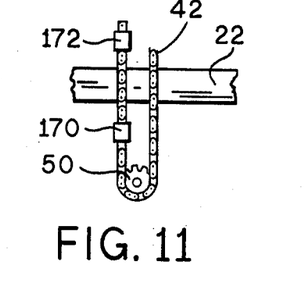
FIG. 11 is a partial side view showing an alternative embodiment of the invention.

Other means for compressing the previously deposited stack of papers can be employed. For example, in an alternative embodiment wherein the plate means 70 includes only a stripper plate 86, the chain-drive arrangement can be used to compress the previously deposited stack with the stripper plate 86. In this alternative embodiment, which is illustrated in FIG. 11, the palletizer further comprises means for sensing the upward force exerted on the stripper plate 86 or plate means 70 by the previously deposited stack of papers, and means for stopping downward movement of the carriage 22 when the force is equal to a predetermined value. Preferably, the means for sensing the upward force exerted on the stripper plate 86 includes means for sensing the tension on at least one of the chains or drive members 42 connected to the carriage 22.

In the illustrated construction (see FIG. 11), this tension sensing means includes a load cell 170 attached to one of the chains 42. When the load cell 170 senses a predetermined tension on the chain 42, downward movement of the carriage 22 is stopped. In the illustrated construction, the load cell 170 is attached to the chain 42 beneath the carriage 22 so that the load cell 170 will measure an increased tension on the chain 42 only after the entire weight of the stripper plate 86 and the carriage 22 is supported by the previously deposited stack of papers and the stripper plate wheels 110 have moved upwardly against the upper surfaces of the carriage channels 34, as described above. Alternatively, a load cell 172 can be attached to the chain 42 above the carriage 22 for measuring the decrease in tension as soon as the previously deposited stack begins to support the stripper plate 86.

The palletizer 10 operates as follows: A pallet 74 is placed beneath the right end of the frame 14, as shown in FIG. 1. Individual stacks of papers are transported to the palletizer 10 by the conveyor means 154, as shown in FIG. 2. When an entire row of papers is assembled at the end of the conveyor means 154, the pusher means 158 pushes the row of papers onto the staging area 162. This process continues until the staging area 162 and the conveyor means 154 is filled with an entire layer of papers. Then, with the plate means 70 in the left position or adjacent the staging area 162, and with the carriage 22 at a height such that the stripper plate 86 is level with the staging area 162, the pusher means 158 pushes the entire layer of papers onto the stripper plate 86.

Figure 5:
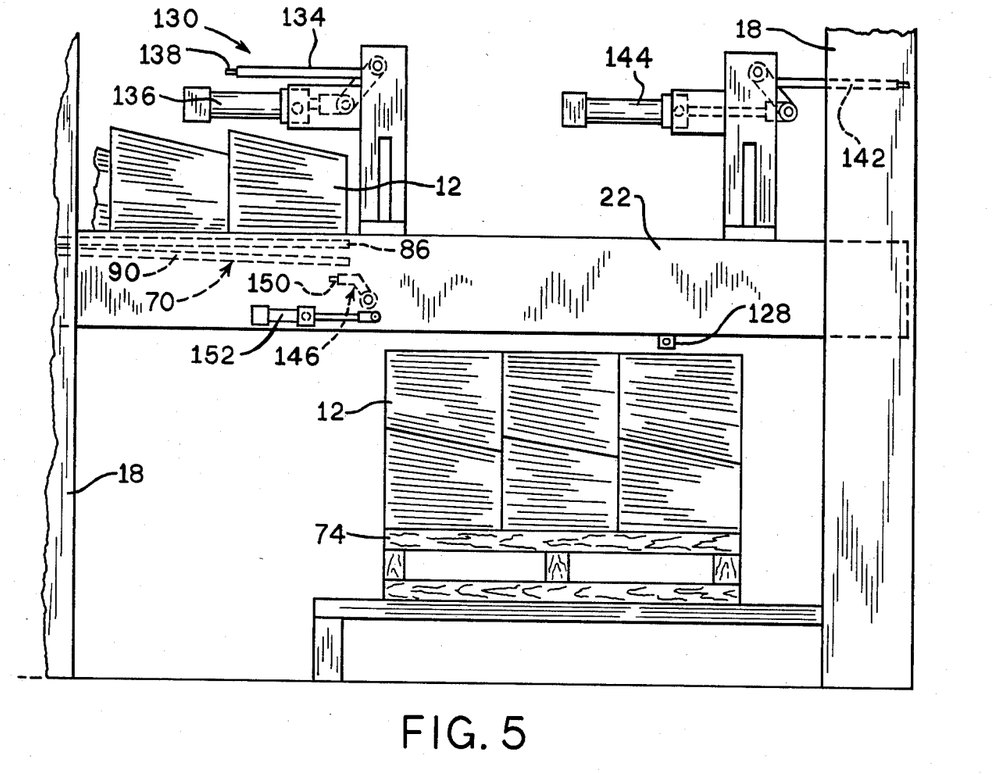
FIGS. 5 through 8 are enlarged, partial side views of the pallettizer showing sequential operation thereof.
Figure 6:
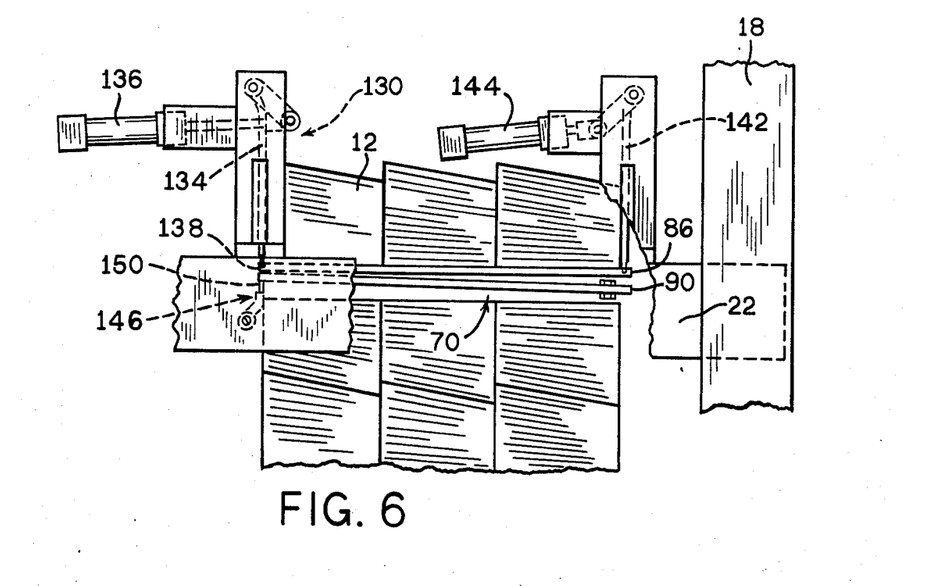
Figure 7:
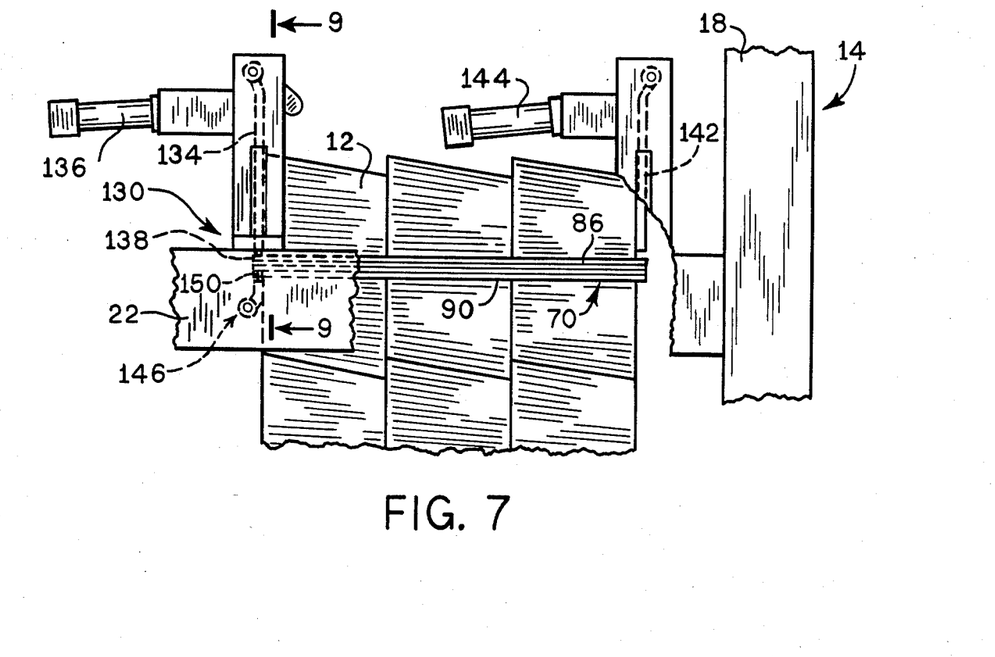
Figure 8:
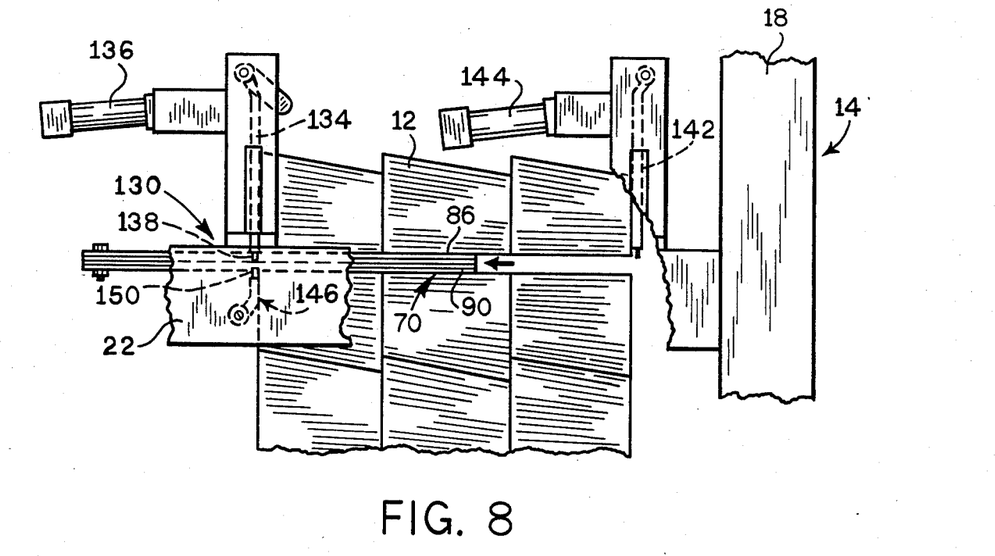

Next, the carriage 22 moves to a height above the supporting surface (either the pallet or a previously deposited stack of papers), as shown in FIG. 5, and the plate means 70 moves to the right position above the pallet, as shown in FIG. 6. The electric eye 128 can be used to determine when the carriage 22 is above the supporting surface. Then, the carriage 22 is lowered until stopped by upward movement of the sensing plate 90, as described previously. This position is shown in FIG. 7. Thus, the preferred amount of compression, as described in the instant operational scenario, is approximately equal to the amount of force required to lift the sensing plate, namely the weight of the sensing plate, more or less, which weight may be selected as desired, according to the amount of compression anticipated as desirable. Next, with the guide plates 134 and 142 in the lowered position, and with the lower fingers 150 in the raised position, the plate means 70 is withdrawn from the right to the left, as shown in FIG. 8. As the plate means 70 moves to the left, the plate 134 and the fingers 138 prevent the stack of papers on the stripper plate 86 from moving with the stripper plate 86, and the fingers 150 prevent the top papers on the previously deposited stack of papers from moving with the sensing plate 90.

When the plate means 70 reaches the left position, the guide plates 134 and 142 are returned to the raised position, the fingers 150 are returned to the lowered position, and the carriage 22 is returned to the position in which the stripper plate 86 is level with the staging area 162. The above steps are then repeated until the pallet is full.

Various features of the invention are set forth in the following claims.

What is claimed is:

1. A palletizer apparatus for depositing material on a supporting surface, said apparatus comprising:
   (a) a frame;
   (b) a generally horizontal plate means mounted on said frame for vertical movement relative to said frame and the supporting surface, said plate means being adapted to be lowered toward the supporting surface in order to deposit the material thereon, said plate means including a stripper plate including an upwardly facing surface adapted to carry the material;
   (c) means for moving said plate means downwardly relative to said frame; and
   (d) means for stopping downward movement of said plate means relative to the supporting surface, said stopping means including a sensing plate mounted beneath said stripper plate, said sensing plate including a downwardly facing surface having therein a plurality of recesses extending in the direction of plate means movement, said apparatus further comprising second stripper means having a second combing means mounted on said frame and extending upwardly into said recesses in said downwardly facing surfaces.

2. A palletizing apparatus for depositing material on a supporting surface, said apparatus comprising:
   (a) a frame;
   (b) a carriage having opposite first and second ends and being mounted on said frame for reciprocal vertical movement relative to said frame and to the supporting surface, said carriage being adapted to be lowered toward the supporting surface in order to deposit the material thereon;
   (c) means for reciprocally vertically moving said carriage relative to said frame;
   (d) generally horizontal plate means mounted on said carriage for reciprocal horizontal movement relative to said carriage between a first position wherein said plate means is adjacent said first end of said carriage and a second position wherein said plate means is adjacent said second end of said carriage, said plate means including a stripper plate having an upwardly facing surface adapted to carry the material during movement of said plate means from said second position to said first position;
   (e) means for reciprocally moving said plate means between said first position and said second position; and
   (f) means for stopping downward movement of said carriage relative to the supporting surface, said stopping means including a sensing plate mounted beneath said stripper plate,
   said sensing plate including a downwardly facing surface having therein a plurality of recesses extending in the direction of plate means movement, said apparatus further comprising second projection means mounted on said carriage and extending upwardly into said recesses in said downwardly facing surface for preventing previously deposited material from moving with said sensing plate as said plate means is withdrawn from said first position to said second position.

3. An apparatus as set forth in claim 2 wherein said sensing plate includes a lower surface having thereon a plurality of generally parallel, spaced apart, low friction strips extending in the direction of plate means movement and having lower surfaces combining to define said downwardly facing surface, with the spaces between said strips defining said recesses in said downwardly facing surface.

4. A palletizing apparatus for depositing a stack of loose material on a supporting surface, said apparatus comprising:
   (a) a frame;
   (b) plate means mounted on said frame and including a downwardly facing surface having therein a plurality of recesses extending in the direction of plate means movement, and an upwardly facing surface adapted to support the stack of loose material;
   (c) first stripper means for preventing the stack of loose material from moving with said plate means as said plate means moves relative to the stack of loose material;
   (d) second stripper means for preventing a previously deposited stack of loose material from moving with said plate means, said second stripper means including combing means mounted on said frame and extending upwardly into said recesses in said downwardly facing surface, and
   (e) means for reciprocally moving one of said plate means and said first and second stripper means relative to the other of said plate means and said first and second stripper means for depositing the stack of loose material on the supporting surface.

5. An apparatus as set forth in claim 4 wherein said means for moving one of said plate means and said first and second stripper means includes means for reciprocally, horizontally moving said plate means relative to said frame and to the supporting surface between spaced apart first and second positions, and wherein said first stripper means prevents the stack of loose material from moving with said plate means relative to the supporting surface as said plate means is withdrawn from said first position to said second position.

6. An apparatus as set forth in claim 5 wherein said upwardly facing surface of said plate means has therein a plurality of recesses extending in the direction of plate means movement, and wherein said first stripper means includes combing means mounted on said frame and extending downwardly into said recesses.

7. A palletizing apparatus usable for depositing a stack of loose papers on a supporting surface, said apparatus comprising:
   (a) a frame;
   (b) plate means mounted on said frame for reciprocal horizontal movement relative to said frame and to the supporting surface between spaced apart first and second positions, said plate means including a downwardly facing surface having therein a plurality of recesses extending in the direction of plate means movement;

(c) means for reciprocally moving said plate means between said first and second positions; and (d) projection means mounted on said frame and extending upwardly into said recesses for preventing a previously deposited stack of papers from moving with said plate means relative to the supporting surface as said plate means is withdrawn from said first position to said second position.

8. An apparatus as set forth in claim 7 wherein said plate means includes an upper surface, and a plurality of generally parallel, spaced apart, low friction strips extending in the direction of plate means movement and having upper surfaces combining to define said upwardly facing surface, with the spaces between said strips defining said recesses in said upwardly facing surface.

9. An apparatus as set forth in claim 7 wherein said plate means further includes an upwardly facing surface adapted to carry the stack of papers during movement of said plate means from said second position to said first position and having therein a plurality of recesses extending in the direction of plate means movement, and wherein said apparatus further comprises second projection means mounted on said frame and extending downwardly into said recesses in said upwardly facing surface for preventing the stack of papers from moving with said plate means as said plate means is withdrawn from said first position to said second position.

10. An apparatus as set forth in claim 7 wherein said plate means includes a plurality of generally parallel, spaced apart, low friction strips extending in the direction of plate means movement and having lower surfaces of said strips combining to define said downwardly facing surface, with the spaces between said strips defining said recesses in said downwardly facing surface.

11. An apparatus as set forth in claim 7 wherein said plate means is movable vertically relative to said frame and is adapted to be lowered toward the supporting surface in order to deposit a stack of papers thereon, and wherein said apparatus further comprises means for moving said plate means downwardly relative to said frame, and means for stopping downward movement of said plate means relative to the supporting surface.

12. An apparatus as set forth in claim 7 wherein said plate means is movable vertically relative to said frame and is adapted to be lowered toward a previously deposited stack of papers in order to deposit an additional stack of papers thereon, and wherein said apparatus further comprises means for moving said plate means downwardly relative to said frame and including means for applying a downward force on said plate means, in addition to the force of gravity, so as to compress the previously deposited stack of papers.

13. An apparatus as set forth in claim 12 and further comprising means for sensing the upward force exerted on said plate means by the previously deposited stack of papers, and means for stopping downward movement of said plate means when said force exceeds a predetermined value.

14. An apparatus as set forth in claim 13 wherein said means for moving said plate means downwardly includes a drive member connected beneath said plate means, and means for moving said drive member downwardly relative to said frame to pull said plate means downwardly, and wherein said sensing means includes means for sensing the tension on said drive member.

15. An apparatus as set forth in claim 14 wherein said tension sensing means includes a load cell attached to said drive member.

16. An apparatus as set forth in claim 14 wherein said frame includes upper and lower sprockets rotatably mounted on said frame, wherein said drive member includes an endless chain mounted on said upper and lower sprockets and connected to said plate means, and wherein said sensing means includes means located beneath said plate means for sensing the tension of said chain.

17. An apparatus as set forth in claim 16 wherein said tension sensing means includes a load cell attached to said chain.

18. A palletizing apparatus usable for depositing a stack of loose material on a supporting surface, said apparatus comprising:

(a) a frame;

(b) a carriage having opposite first and second ends and being mounted on said frame for reciprocal vertical movement relative to said frame and to the supporting surface;

(c) means for reciprocally vertically moving said carriage relative to said frame;

(d) generally horizontal plate means mounted on said carriage for reciprocal horizontal movement relative to said carriage between a first position wherein said plate means is adjacent said first end of said carriage and a second position wherein said plate means is adjacent said second end of said carriage, said plate means including a downwardly facing surface having therein a plurality of recesses extending in the direction of plate means movement;

(e) means for reciprocally moving said plate means between said first position and said second position; and (f) projection means mounted on said carriage and extending upwardly into said recesses for preventing a previously deposited stack of papers from moving with said plate means as said plate means is withdrawn from said first position to said second position.

19. An apparatus as set forth in claim 18 wherein said plate means includes an upper surface, and a plurality of generally parallel, spaced apart, low friction strips extending in the direction of plate means movement and having upper surfaces combining to define said upwardly facing surface, with the spaces between said strips defining said recesses in said upwardly facing surface.

20. An apparatus as set forth in claim 18, said downwardly facing surface comprising a plurality of generally parallel, spaced apart, low friction strips extending in the direction of plate means movement and having lower surfaces combining to define said downwardly facing surface, the spaces between said strips defining said recesses in said downwardly facing surface.

21. A palletizing apparatus for depositing a layer of articles onto a supporting surface, said apparatus comprising:

(a) a frame;

(b) plate means mounted on said frame for reciprocal movement between horizontally spaced apart first and second positions, and for reciprocal vertical movement relative to said frame and to the supporting surface, said plate means including a downwardly facing surface, and an upwardly facing surface adapted to carry the layer of articles during movement of said plate means from said second position to said first position;

(c) means for vertically moving said plate means relative to said frame and including means for applying a downward force on said plate means, in addition to the force of gravity, so as to compress a previously deposited layer of articles with said downwardly facing surface of said plate means, and means for withdrawing said plate means from said first position to said second position while said previously deposited articles are under said compression;

(d) means for preventing the layer of articles from moving with said plate means relative to the supporting surface as said plate means is withdrawn from said first position to said second position; and (e) means for preventing the previously deposited layer of articles from moving with said plate means as said plate means is withdrawn from said first position to said second position.

22. An apparatus as set forth in claim 21 and further comprising means for sensing the upward force exerted on said plate means by the previously deposited layer of articles, and mans for stopping downward movement of said plate means, in response to an input from said sensing means.

23. An apparatus as set forth in claim 22 wherein said means for moving said plate means downwardly includes a drive member connected beneath said plate member, and means for moving said drive member downwardly relative to said frame to pull said plate means downwardly, and wherein said sensing means includes means for sensing the tension on said drive member.

24. An apparatus as set forth in claim 23 wherein said tension sensing means includes a load cell attached to said drive member.

25. An apparatus as set forth in claim 24 wherein said frame includes upper ad lower sprockets rotatably mounted on said frame, wherein said drive member includes an endless chain mounted on said upper and lower sprockets and connected to said plate member, and wherein said sensing means includes means for sensing the tension on said chain.

26. An apparatus as set forth in claim 25 wherein said tension sensing means includes a load cell attached to said chain.

27. An apparatus as set forth in claim 21 wherein said upwardly facing surface of said plate means has therein a plurality of recesses extending in the direction of plate means movement, wherein said downwardly facing surface of said plate means has therein a plurality of recesses extending in the direction of plate means movement, wherein said means for preventing the layer of articles from moving with said plate means includes projection means mounted on said frame and extending downwardly into said recesses in said upwardly facing surface, and wherein said means for preventing the previously deposited layer of articles from moving with said plate means includes second projection means mounted on said frame and extending upwardly into said recesses in said downwardly facing surface.

28. An apparatus as set forth in claim 27 wherein said plate means includes an upper surface, and a plurality of generally parallel, spaced apart, low friction strips extending in the direction of plate means movement and having upper surfaces combining to define said upwardly facing surface, with the spaces between said strips defining said recesses in said upwardly facing surface.

29. An apparatus as set forth in claim 28 wherein said plate means includes a plurality of generally parallel, spaced apart, low friction strips extending in the direction of plate means movement and having lower surfaces combining to define said downwardly facing surface, with the spaces between said strips defining said recesses in said downwardly facing surface.

30. A palletizing apparatus for depositing stacks of loose material onto a supporting surface, said apparatus comprising:

(a) a frame;

(b) plate means mounted on said frame and including an upwardly facing surface adapted to support a stack of loose material, said plate means being moveable vertically relative to said frame and adapted to be lowered toward a previously deposited stack of loose material in order to deposit the stack of loose material thereon;

(c) stripper means for preventing the stack of loose material from moving with said plate means as said plate means moves relative to the stack of loose material; and (d) means for moving said plate means downwardly relative to said frame and including means for compressing the previously deposited stack of loose material and withdrawing said plate means from the supported stack of loose material while the previously deposited material is under said compression.

31. An apparatus as set forth in claim 30 and further comprising means for sensing the upward force exerted on said plate means by the previously deposited stack of loose material, and means for stopping downward movement of said plate means in response to an input from said sensing means.

32. An apparatus as set forth in claim 31 wherein said means for moving said plate means downwardly includes a drive member connected beneath said plate means, and means for moving said drive member downwardly relative to said frame to pull said plate means downwardly, and wherein said sensing means includes means for sensing the tension on said drive member.

33. An apparatus as set forth in claim 32 wherein said tension sensing means includes a load cell attached to said drive member.

34. An apparatus as set forth in claim 32 wherein said frame includes upper and lower sprockets rotatably mounted on said frame, wherein said drive member includes an endless chain mounted on said upper and lower sprockets and connected to said plate member, and wherein said sensing member includes means located beneath said plate means for sensing the tension on said chain.

35. An apparatus as set forth in claim 30 and further comprising a carriage having opposite first and second ends and being mounted on said frame for reciprocal vertical movement relative to said frame and to the supporting surface, and means for reciprocally vertically moving said carriage relative to said frame, wherein said plate means is mounted on said carriage for reciprocal horizontal movement relative to said carriage between a first position wherein said plate means is adjacent said first end of said carriage and a second position wherein said plate means is adjacent said second end of said carriage, wherein said means for moving one of said plate means and said stripper means includes means for reciprocally moving said plate means between said first position and said second position, and wherein said stripper means prevents the stack of loose material from moving with said plate means as said plate means is withdrawn from said first position to said second position.

36. An apparatus as set forth in claim 35 wherein said carriage is adapted to be lowered toward the supporting surface in order to deposit a stack of loose material thereon, and wherein said apparatus further comprises means for stopping downward movement of said carriage relative to the supporting surface.

37. An apparatus as set forth in claim 35 wherein said carriage includes a pair of generally parallel, horizontal, spaced apart first and second side members extending in the direction of plate means movement and movably supporting said plate means therebetween, said first side member defining a first channel opening inwardly toward said plate means and having opposed upper and lower generally horizontal surfaces, and said second side member defining a second channel opening inwardly toward said plate means and having opposed upper and lower generally horizontal surfaces, and wherein said plate means further includes first and second sides respectively adjacent said first and second side members, a wheel rotatably mounted on said first side of said plate means and received in said first channel for rolling movement along one of said upper and lower surfaces of said first channel, and a wheel rotatably mounted on said second side of said plate means and received in said second channel for rolling movement along one of said upper and lower surfaces of said second channel.

38. An apparatus as set forth in claim 35 and further comprising conveyor means extending generally perpendicularly to the direction of plate means movement adjacent said second end of said carriage, and means for moving stacks of loose material from said conveyor means onto said plate means when said plate means is in said second position.

39. An apparatus as set forth in claim 38 wherein said means for moving stacks of loose material from said conveyor means includes pusher means reciprocally movable across said conveyor means in the direction of plate means movement.

40. An apparatus as set forth in claim 35 wherein said frame includes four generally vertical members defining the four corners of a rectangle, wherein said carriage is generally rectangular and has four corners respectively connected to said four vertical members of said frame for vertical movement relative thereto, and wherein said means for moving said carriage relative to said frame includes means on each of said vertical members for causing relative movement of the respective corner of said carriage.

41. An apparatus as set forth in claim 40 wherein said means on each of said vertical members for causing relative movement of said respective corner of said carriage includes an endless chain connected to said respective corner of said carriage.

42. A palletizing apparatus as in claim 30 and including means for stopping downward movement when the force of said compressing reaches a force approximately the force of gravity on said sensing plate.

43. A palletizing apparatus for depositing stacks of loose material onto a supporting surface, said apparatus comprising:
(a) a frame;
(b) plate means mounted on said frame for reciprocal movement between horizontally spaced apart first and second positions, and including an upwardly facing surface adapted to support a stack of loose material, said plate means being moveable vertically relative to said frame and adapted to be lowered toward a previously deposited stack of loose material in order to deposit the stack of loose material thereon; and
(c) means for moving said plate means downwardly relative to said frame and including means for compressing the previously deposited stack of loose material and withdrawing said plate means from said first position toward said second position while said previously deposited material is under said compression.

44. A palletizing apparatus as in claim 43, said plate means including a downwardly facing surface having therein a plurality of recesses extending in the direction of plate means movement from said first position to said second position, and including projection means extending upwardly into said recess for preventing a previously deposited stack of loose material from moving with said plate means as said plate means is withdrawn from said first position to said second position.

45. A palletizing apparatus as in claim 43 and including means for stopping downward movement when the force of said compressing reaches a force approximating the force of gravity on said sensing plate.

46. A method of depositing a second layer of articles on a compressible previously deposited first layer of articles wherein said previously deposited first layer has an uneven top surface, said method comprising the steps of:
(a) arranging said second layer on a plate means, such that said plate means is under said second layer;
(b) positioning said plate means vertically above said first layer;
(c) vertically moving said plate means downwardly onto said first layer, and thereby compressing said first layer such that the unevenness of said top is attenuated;
(d) withdrawing said plate means from under said second layer while said first layer is under compression; and
(e) preventing articles of said first and second layers from moving with said plate means during said withdrawal.

47. A method as in claim 46 wherein said plate means has top and bottom surfaces, and said means for preventing said articles from moving with said plate means comprises a plurality of recesses in both said top and bottom surfaces of said plate means, and first projection means projecting upwardly into said recesses in said bottom surface of said plate means and second projection means projecting downwardly into said recesses in said top surface of said plate means.

48. A method as in claim 46 wherein said plate means comprises a stripper plate, and a sensing plate suspended from said stripper plate, and including limiting the amount of said compression to no more than an amount equal to the weight of said sensing plate.

49. A method as in claim 48 and including the step of selecting, for said sensing plate, a plate having a weight approximating the amount of force required to completely eliminate the unevenness of said top.

50. A method of depositing a second layer of articles on a previously deposited first layer of articles, said method comprising the steps of:
   (a) arranging said second layer on a plate means, such that said plate means is under said second layer, said plate means having top and bottom surfaces, and comprising a plurality of recesses in said top and bottom surfaces;
   (b) positioning said plate means vertically above said first layer;
   (c) vertically moving said plate means downwardly toward said first layer and contacting said first layer; and
   (d) withdrawing said plate means from under said second layer while preventing articles of said first and second layers from moving with said plate means during said withdrawal, by projecting first projecting means downwardly into said recesses in said top surface of said plate means and projecting second projecting means upwardly into said recesses in said bottom surface of said plate means.

51. A method of depositing a second layer of articles on a compressible previously deposited first layer, said method comprising the steps of:
   (a) arranging said second layer on a plate means, such that said plate means is under said second layer;
   (b) positioning said plate means vertically above said first layer;
   (c) vertically moving said plate means toward said first layer, and thereby compressing said first layer;
   (d) withdrawing said plate means from under said second layer while said first layer is under compression; and
   (e) preventing articles of said first and second layers from moving with said plate means during said withdrawal.

* * * * *